United States Patent [19]
Rendessy

[11] 3,871,686
[45] Mar. 18, 1975

[54] TRAILER SWAY CONTROL DEVICE

[76] Inventor: William L. Rendessy, 8028 N. 14th Pl., Phoenix, Ariz. 85020

[22] Filed: June 12, 1973

[21] Appl. No.: 369,263

[52] U.S. Cl............................................ 280/446 B
[51] Int. Cl............................................. B60d 7/00
[58] Field of Search ........... 280/446 R, 446 B, 432; 287/76

[56] References Cited
UNITED STATES PATENTS

| | | | |
|---|---|---|---|
| 2,628,855 | 2/1953 | Cushman | 287/76 |
| 3,305,246 | 2/1967 | Gonczy | 280/432 X |
| 3,338,595 | 8/1967 | Bogie | 280/432 UX |
| 3,659,874 | 5/1972 | Rendessy | 280/432 |

Primary Examiner—Leo Friaglia
Assistant Examiner—R. Schrecengost
Attorney, Agent, or Firm—Warren F. B. Lindsley

[57] ABSTRACT

A sway control device for use with trailers and other towed vehicles wherein a belt, cable or other flexible operating means having its opposite ends attached to opposite sides of the rear of a towing vehicle utilizes the intermediate portion of the flexible operating means to frictionally engage the perimeter of at least one non-rotatable arcuate surface mounted on the forward portion of the vehicle to be towed. Mechanical toggle means are provided to tautly bias the flexible operating means against the perimeter of the non-rotatable arcuate surface to cause dampened frictional restraint thereon which in turn resists lateral movement between the towing vehicle and the towed vehicle thus preventing oscillation or sway in the area of the hitch ball connection. Since the frictional restraint between the flexible operating means employed and the non-rotatable arcuate surfaces can be predetermined to sufficiently prevent trailer sway, no frictional adjustments other than the tightening of the flexible tensioning means against the arcuate surfaces is required by the user.

26 Claims, 10 Drawing Figures

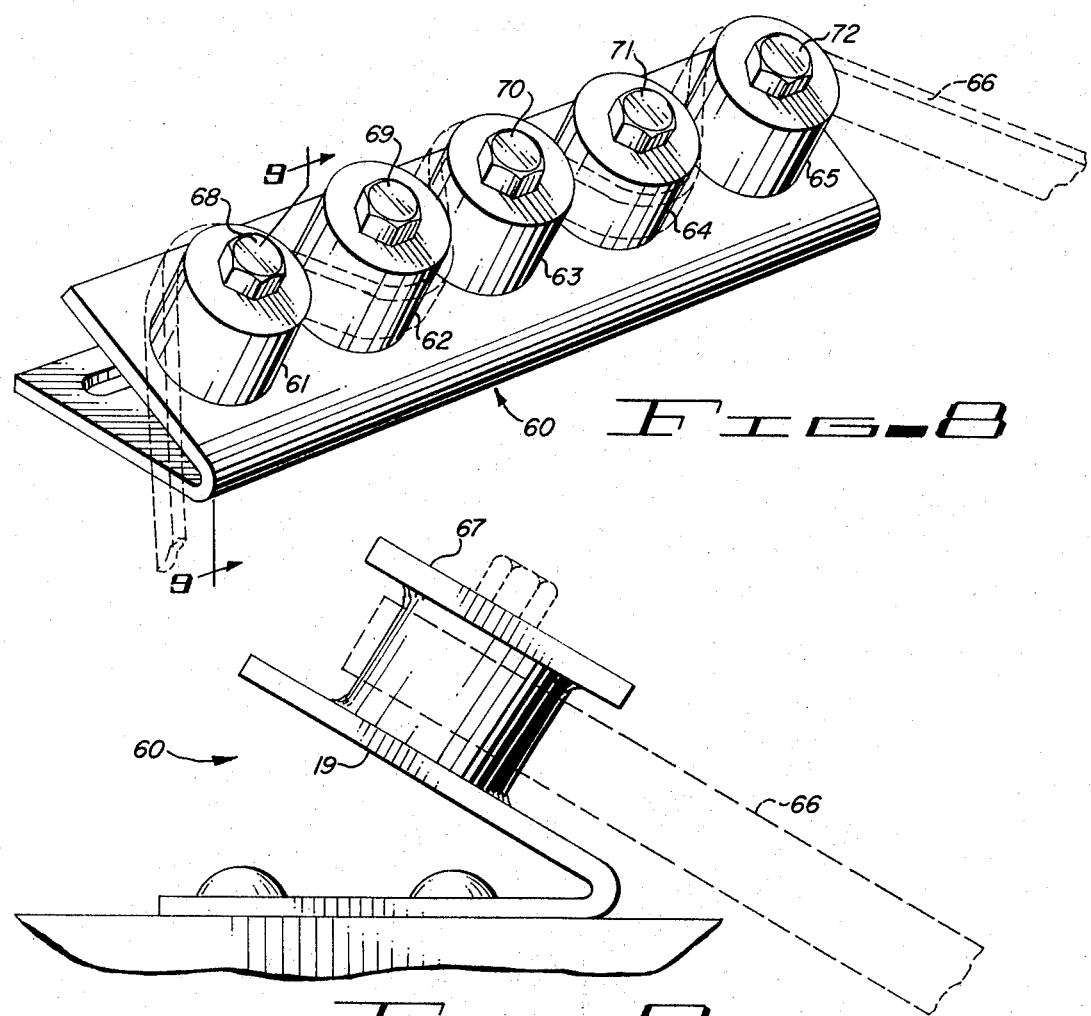
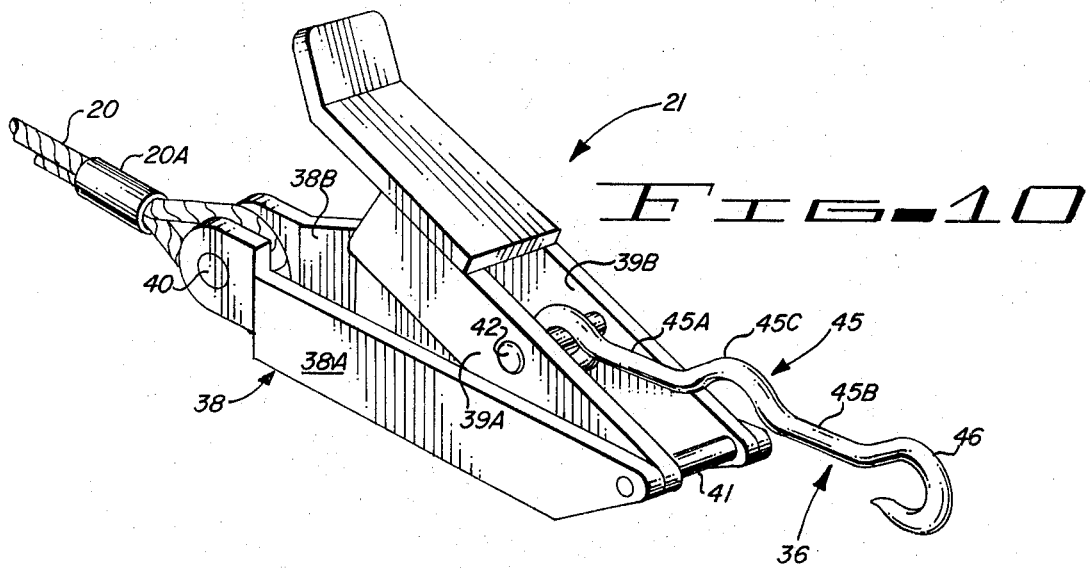

TRAILER SWAY CONTROL DEVICE

BACKGROUND OF THE INVENTION

Highway safety has in recent years received increased attention from governmental agencies, as well from the general public, and the importance of improved safety features in motor vehicles has become important with the rising numbers and densities of such vehicles of the highways.

The use of towed trailers behind automobiles or lightweight trucks has become quite commonplace and the hazards associated with such vehicular combinations are well-known. A particularly dangerous characteristic of the towed trailer is its tendency to sway from side to side under certain conditions. Such action may be initiated by sudden turns, by cross-winds or by air drafts produced by passing trucks. Certain combinations of various parameters, such as the length of the trailer tongue, the weight of the load and the surface of the highway increase the tendency for the trailer to sway and even increases the intensity or amplitude of the swaying action once it has started. Under such conditions, it is difficult, if not impossible, for the driver to maintain control of his vehicle.

The combination of the towing vehicle and the trailer in the presence of such critically related parameters constitutes an unstable mechanical system. The swaying back and forth of the trailer is analogous to the oscillations produced by an unstable electrical system. In electrical systems such oscillations are reduced by the introduction of resistive elements which dissipate the energy producing the oscillations; in mechanical systems, friction devices are incorporated to dissipate the energy associated with the instability.

Prior art sway-control devices have utilized friction produced in various ways. Typically, they have employed cables in conjunction with rotating pulleys or spools wherein the cables engage the spools causing them to rotate as the trailer pivots about its point of connection to the towing vehicle. Rotation of the spools is frictionally restrained to produce the damping action essential to the prevention of the swaying action.

The prior art devices have certain disadvantages. The pulleys or spools and other moving parts associated with such devices require periodic adjustments to insure their proper operation and to prevent excessive Furthermore, or damage. Frequently these moving parts become ineffective or inoperative due to excessive wear and they must be replaced. Firthermore, the operation of connecting the trailer to the towing vehicle often involves considerable difficulty when such prior art devices are employed. If the connection is made when the towing vehicle is in a different position relative to the trailer than when it was previously disconnected, the threading of the cable or other flexible means through the pulleys or spools may be difficult.

SUMMARY OF THE INVENTION

In accordance with the invention claimed, an improved and novel sway control device is provided which prevents the swaying motion of trailers. The improved device utilizes belt or other flexible operating means tautly interconnected between the rear of a towing vehicle and the perimeter of one or more fixed non-rotatable arcuate surfaces mounted on the tongue of a towed trailer to obtain controlled frictional drag to dampen lateral movement of the trailer and towing vehicle. Mechanical toggle means are provided to simplify and expedite the engagement and disengagement of the flexible operating means employed from the friction bearing surfaces of non-rotatable arcuate surfaces and from the rear of the towing vehicle. The size and construction of the belt and the non-rotatable arcuate surfaces can be predetermined for the amount of frictional restraint necessary to prevent trailer sway and can be built into the device at the factory; thus, no adjustments, such as the tightening and loosening of nuts to obtain proper frictional dampening of rotatable rotors as diclosed in prior art, would be necessary. In some instances, it may be desirable to employ one or more rotatable rotors in combination with the non-rotatable arcuate surfaces to lessen the frictional restraint since employing all non-rotatable arcuate surfaces with flexible operating means may cause excessive frictional restraint when mounted in certain arrangements and combinations desirable for mounting on the tongue of a trailer.

It is, therefore, one object of this invention to provide an improved sway control device for a towed trailer.

Another object of this invention is to provide such an improved sway control device which has a minimum number of moving parts.

A further object of this invention is to provide an improved sway control device that would eliminate the need of the user for making frictional dampening adjustments for sufficient sway control.

A still further object of this invention is to provide a novel sway control device that becomes automatically operative upon engagement of flexible means against non-rotatable friction bearing surfaces.

A still further object of this invention is to reduce or eliminate the costs of pulleys, shafts, adjustment nuts, brake material and tensioning springs.

A still further object of this invention is to provide a sway control employing non-rotatable arcuate surfaces that require only a segment of a rotatable diameter, thus reducing its weight and also the width of the device for mounting in narrower restricted spaces available on the tongue of a trailer.

Yet another object of this invention is to provide a sway control device interconnected between a trailer and a towing vehicle that is of simple construction, easily mounted, easily operated, effective and inexpensive.

Further objects and advantages of the invention will become apparant as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 8 illustrates a still further modification of the fixed portion of the sway control device shown in FIGS. 1—7.

FIG. 9 is a cross-sectional view partly in elevation of FIG. 8 taken along the line 9—9.

FIG. 10 is a perspective view of a latching device employed in the connection of the flexible cable of the sway control device shown herein.

DESCRIPTION OF THE PREFERRED EMBODIMENTS

Figure 1:
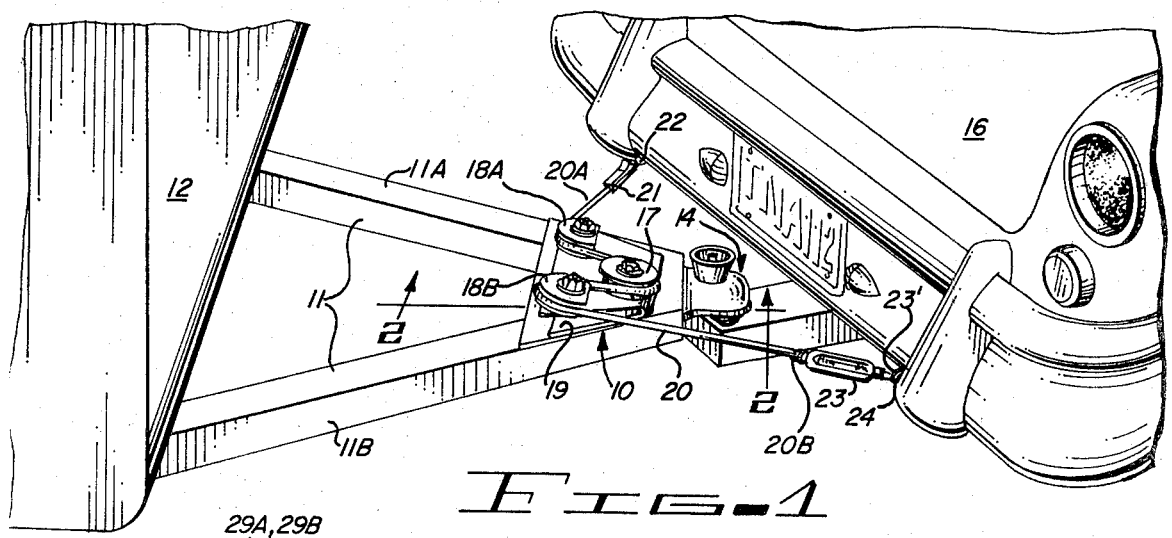
FIG. 1 is a perspective view showing the improved sway control device mounted on the tongue of a trailer and attached to the rear bumper of a connected towing vehicle.
Figure 2:
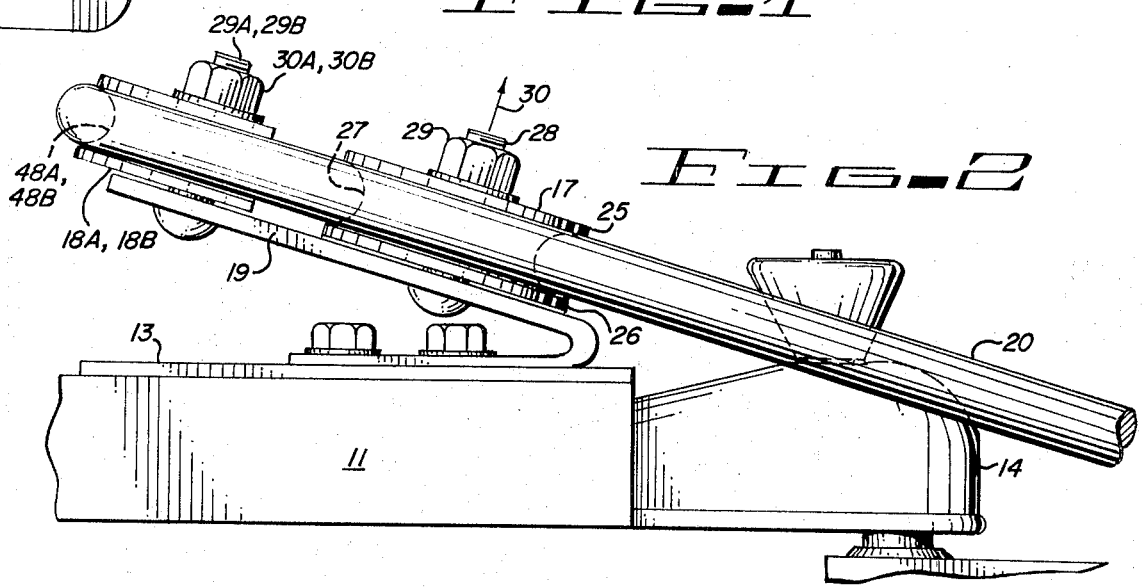
FIG. 2 shows a cross-sectional view partly in elevation of the sway control device of FIG. 1 taken along the line 2—2.
Figure 3:
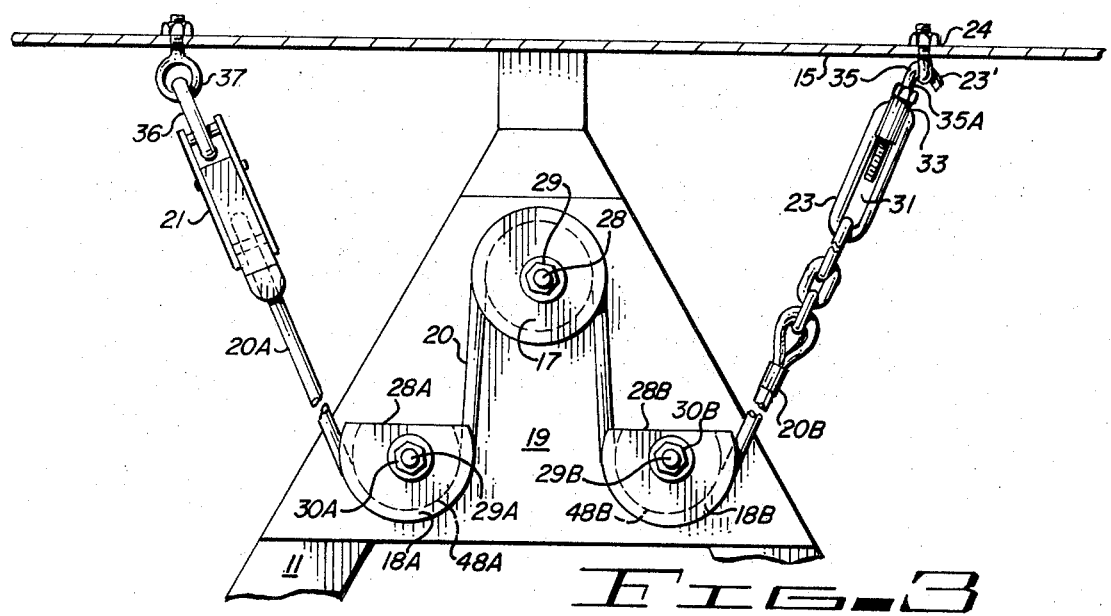
FIG. 3 shows a partial plan view of the sway control device of FIG. 1.

Referring more particularly to the drawing by characters of reference, FIGS. 1-3 disclose a sway control device 10 mounted on a tongue 11 of a trailer 12. Tongue 11 comprises a pair of converging drawbars 11A and 11B secured at their forward ends by a plate 13 which supports a conventional trailer hitch 14 shown secured to the rear bumper 15 of a towing vehicle 16.

The sway control device 10 comprises a pulley or spool 17 and two rearwardly spaced fixed cable guides 18A and 18B mounted on an inclined bracket 19. A flexible cable 20 is threaded in a serpentine path partially surrounding the spool 17 and cable guides 18A and 18B. A first end 20A of the flexible cable 20 is connected by means of a toggle or clamp release 21 to bumper 15 of the towing vehicle 16 at a point 22 near its left end. Its second end 20B is connected through a turnbuckle 23 and clamp 23' to bumper 15 at a point 24 near its right end. Turn buckle 23 is utilized to tighten the cable, as desired. Spool 17 is of a conventional design having flat circular end surfaces or plates 25 and 26, respectively, and an annular bearing surface 27 which may be grooved, if so desired. Spool 17 is secured to inclined bracket 19 by means of bolt 28 and nut 29 and is free to rotate about its axis 30 on bolt 28.

Rear cable guides 18A and 18B may have the same general shape as spool 17 including flat circular end surfaces or plates and grooved or ungrooved annular bearing surfaces, or they may be modified as shown in FIGS. 1-3 wherein a portion of each guide has been removed by means of a cut perpendicular to the flat circular surfaces of guides 18A and 18B along chords 28A and 28B as shown. Cable guides 18A and 18B are secured by means of bolts 29A, 29B and nuts 30A, 30B to bracket 19 in a fixed manner which prevents their rotation about bolts 29A, and 29B. If preferred, guides 18A and 18B may be welded to bracket 19. In the case of the bolted connection, the flat surface formed by the cut along chord 28A or 28B may be utilized to prevent rotation by causing this surface to bear against a ridge or other form of protrusion of bracket 19. Bracket 19 is inclined to provide proper alignment of the spool 17 and cable guides 18A and 18B with respect to points 22 and 24 on bumper 15. The serpentine path taken by cable 20, as shown, lies in a plane which bisects the annular bearing surfaces of spool 17 and guides 18A and 18B and passes also through points 22 and 24 on bumper 15. Bracket 19 may be bolted, as indicated, or welded to base plate 13.

Turnbuckle 23 is a conventional means for adjusting tension in cables and is here employed to adjust the tension in cable 20. It comprises an elongated cylinder housing having a longitudinal slot 31. The cylindrical housing at end 33 of turnbuckle 23 is arranged to receive a threaded open eye bolt 35 which is fixedly attached to bumper 15 through clamp 23' at point 24. As turnbuckle 23 is rotated relative to stud 35, engagement of the corresponding threaded surfaces of turnbuckle 23 and stud 35 causes the tension in cable 20 to increase or decrease depending on its direction of rotation. When tension is schieved, jam nut 35A is tightened and locked in place.

Toggle release 21 is attached to end 20A of cable 20 and connects by means of a hook 36 to ring 37 which is attached to bumper 15 at point 22. Toggle release 21 provides a means for quickly releasing tension in cable 20 in preparation for disconnecting sway control device 10 from towing vehicle 16. As shown more clearly in FIG. 10, toggle release 21 comprises an outer elongated member 38 having an inner member 39 pivotally attached at one end for nesting inside of member 38. Hook 36 is pivotally mounted within member 39, as shown. Outer member 38 is in the form of two parallel flat metal straps 38A and 38B converging at one end where they are joined together by a transverse metal pin 40. Pin 40 and converging ends of plates 38A and 38B are firmly secured to the looped end of cable 20. Inner member 39 is also in the form of two parallel metal straps 39A and 39B jointed by a transverse plate 39C. Straps 39A and 39B are more closely positioned together then parallel straps 38A and 38. of outer member 38 to allow inner member 39 to be nested snugly inside outer member 38. The non-converging end of outer member 38 is pivotally connected by means of pin 41 to the corresponding end of inner member 39. Hook 36 is pivotally connected to inner member 39 by means of a pin 42 which passes perpendicularly through parallel plates 39A and 39B and which is firmly attached thereto. Hook 36 comprises a ring end 44 surrounding pin 42 and an elongated arm 45 comprising three parts, namely straight portions 45A and 45B interconnecting a loop portion 45C. A hook end 46 is arranged at the free end of straight portion 45B.

When inner member 39 of toggle release 21 is fully nested inside outer member 38, the top edges of parallel straps 38A, 38B, 39A and 39B are mutually aligned in a common plane and the extended lower surfaces of plate 39C rest against the upper edges of straps 38A and 38B. In the nested position and with hook end 46 attached to a fixed object, tension applied to cable 20 causes straight portions 46A and 46B of hook 36 to be aligned collinearly with cable 20 and, because pin 41 which pivotally joins members 38 and 39 is located above this line of collinear alignment, the applied tension produces a moment of force about pin 41 which causes plate 39C to bear against the upper edges of straps 38A and 38B which force serves to hold members 38 and 39 securely in the nested position. Loop portion 45C of hook 36 partially surrounds pin 41 in the nested position.

To release toggle release 21 in the presence of cable tension, the raised end 47 of plate 39C may be grasped and forced upwardly against the downward force produced by the cable tension. As member 39 thus rises in its rotation about pin 41, the effective length of the toggle release assembly increases and relieves the tension. The increased effective length of the toggle release in the fully released position also allows for the disengagement of hook end 46 from the ring or other means to which it had been attached.

To prepare sway control device 10 for use, the trailer hitch 14 is first coupled to bumper 15 of the towing vehicle and the ends of cable 20 are attached at points 22 and 25 to the bumper. Toggle release 21 is set to the nested or closed position and turnbuckle 23 is adjusted to produce the desired tension in cable 20 which now follows a serpentine path beginning at end 20A, passing partially around cable guide 18A, spool 17, and cable guide 18B to its point of attachment to turnbuckle 23. In passing partially around cable guides 18A and 18B, cable 20 makes contact with the bearing surfaces 48A and 48B of guides 18A and 18B. As tension in cable 20 in increased, cable 20 bears against these surfaces with increasing pressure and the additional force which must be applied to overcome this friction to produce relative displacement between cable 20 and surfaces 48A and 48B of guides 18A and 18B is correspondingly increased. Because it is desired to obtain as high a frictional force as possible without having to provide excessive initial tension in cable 20, the particular geometric arrangement of guides 18A and 18B and spool 17 is important. As FIG. 3 illustrates, the use of spool 17 in the position shown approximately doubles the contact surface area between cable 20 and the bearing surfaces 48A and 48B of guides 18A and 18B as compared with what would be realized if spool 17 were omitted.

Furthermore, for the same initial tension in cable 20, the total integrated perpendicular force over the bearing surfaces of guides 18A and 18B is exactly doubled by the use of spool 17. With experience, the user will be able to make the foregoing adjustments quickly and easily and will be able to judge the proper adjustment by the apparent tension in cable 20. Use of the toggle release for subsequent connections and disconnections further simplifies the operation and removes the necessity for repeating the tension adjustment with each use.

In the operation of the invention, as the towing vehicle 16 turns, or as the trailer 12 moves laterally with respect to the direction of travel of the towing vehicle 16, cable 20 moves relative to the bearing surfaces 48A and 48B of guides 18A and 18B. Frictional forces acting over these surfaces, however, opposes such relative motion and significantly reduces any tendency toward instability or overshoot due to stored inertial energy. The stored energy is dissipated as heat produced by work done overcomes friction. Because spool 17 is free to turn, it is not prone to rapid or excessive wear as in the case of the frictionally restrained spools or pulleys employed in prior art devices. Due to the relatively enlarged bearing surfaces over which the friction losses are distributed in the case of the fixed cable guides 18A and 18B and also because these parts are fixed rather than rotating, wear on these parts is minimal.

Figure 4:
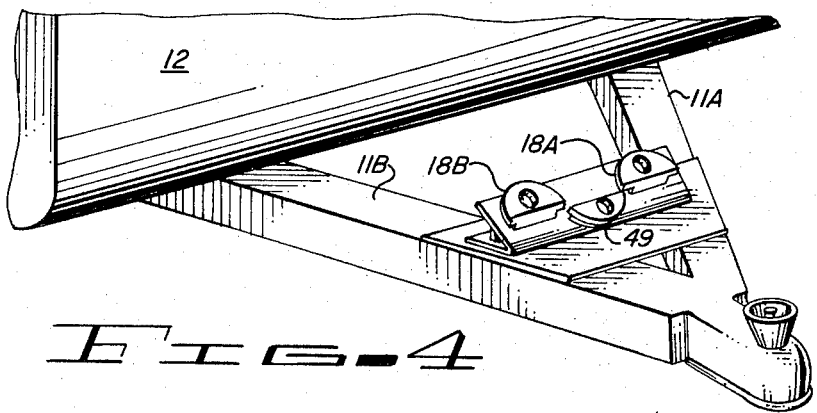
FIG. 4 shows a modification of the fixed portion of the sway control device shown in FIG. 1.
Figure 5:
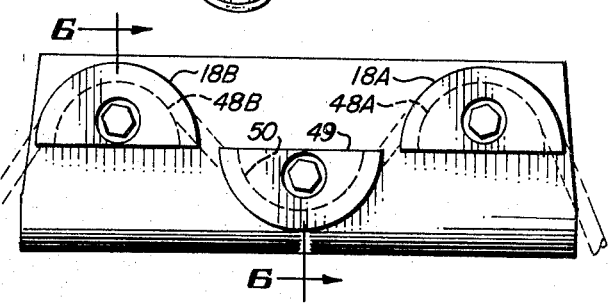
FIG. 5 shows a partial plan view of the device shown in FIG. 4.
Figure 6:
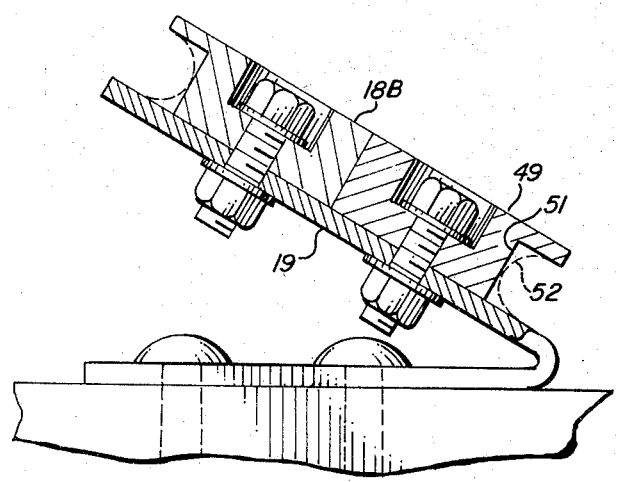
FIG. 6 shows a cross-sectional view of FIG. 5 along the line 6—6.

A modified form of a portion of sway control device 10 and of FIGS. 1-3 is shown in FIGS. 4-6 where spool 17 has been replaced by a third fixed cable guide 49. Cable guide 49 is substantially the same form as guides 18A and 18B and is bolted rigidly to inclined bracket 19. Cable 20 again takes a serpentine path, as illustrated in FIG. 5, passing from left to right over bearing surface 48B of guide 18B, downwardly and over bearing surface 50 of guide 49, upwardly and over bearing surface 48A of guide 18A. As evidenced in FIG. 5, this variation adds the bearing surface 50 of guide 49 to the bearing surfaces 48A and 48B provided by guides 18A and 18B. An increase of approximately 50 percent in both bearing surface area and friction force per unit of cable tension is realized in this modification. For the above reason and because of the elimination of spool 17, the advantages of this modification are improved performance and longer life. As indicated in FIG. 6, the bearing surfaces of guides 18A, 18B and 49 may have a flat, smooth surface 51 or concave surface 52 which provides greater contact area between these surfaces and cable 20. Again, guides 18A, 18B and 49 may be welded to bracket 19 or they may be bolted as shown in FIGS. 4–6.

Figure 7:
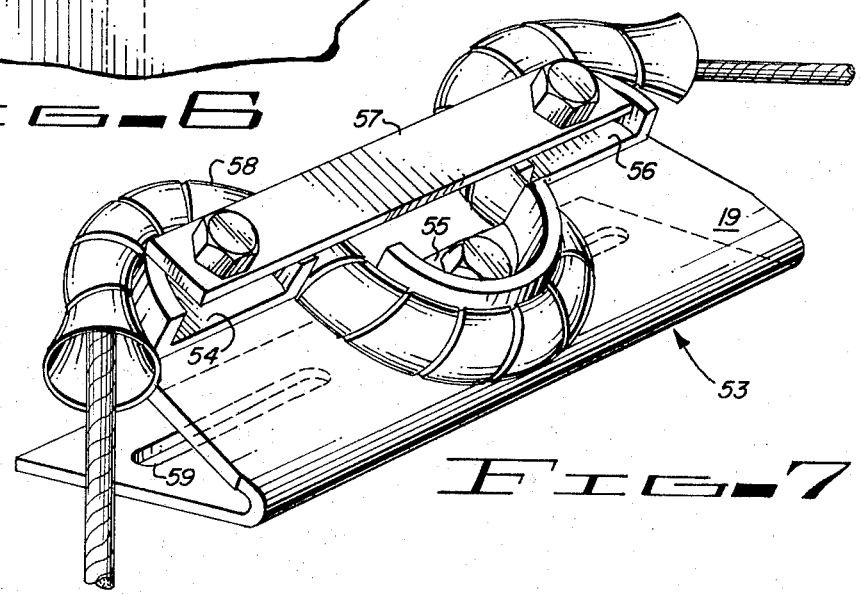
FIG. 7 shows a further modification of the device shown in FIGS. 1—6.
Figure 11:
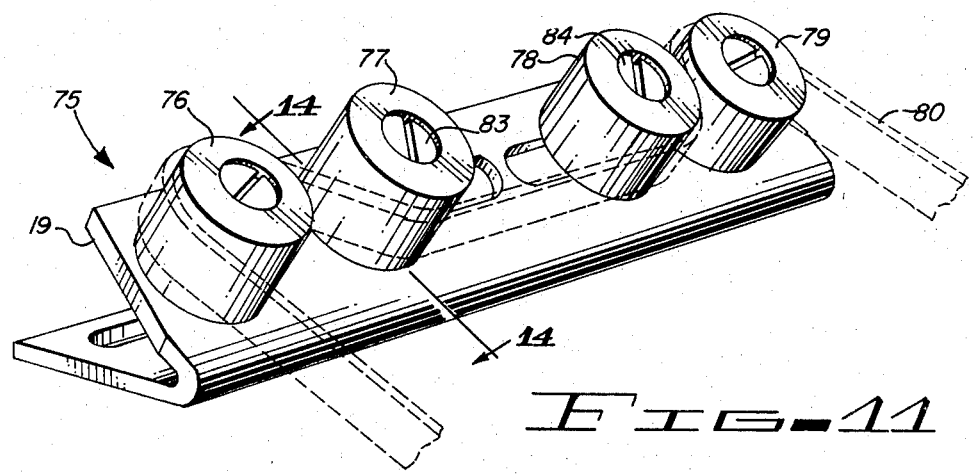
FIG. 11 is a perspective view of a modification of the structure shown in FIGS. 8 and 9 wherein the center two cylindrical guides are adjustably positioned on the bracket.
Figure 12:
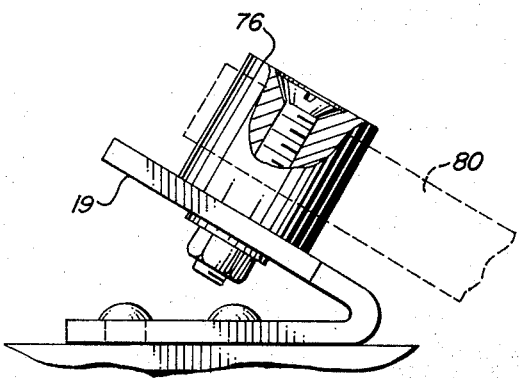
FIG. 12 is a cross-sectional view partly in elevation of FIG. 11 taken along line 12—12.
Figure 14:
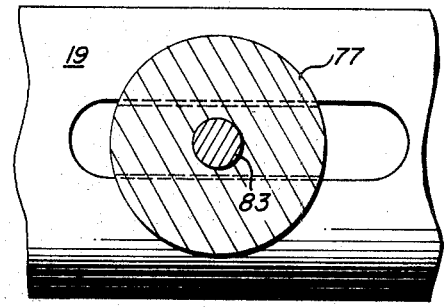
FIG. 14 is a cross-sectional view of FIG. 11 taken along the line 14—14.
Figure 13:
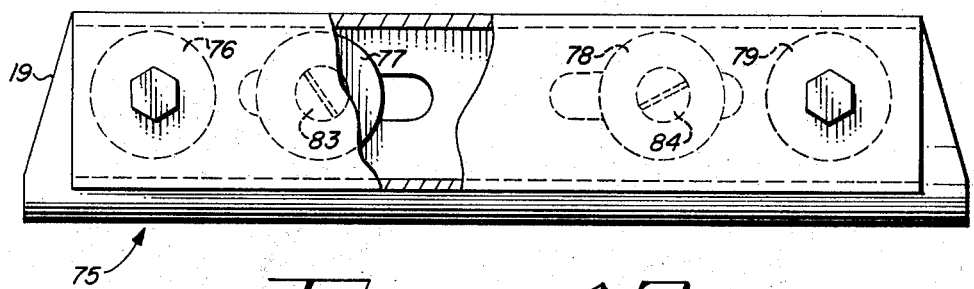
FIG. 13 is a top view of FIG. 11 showing a cover plate.

FIG. 7 illustrates a modified cable guide assembly 53 comprising again inclined bracket 19 on which are rigidly mounted three fixed cable guide supports 54, 55 and 56. Arranged in a serpentine path around guide supports 54, 55 and 56 and held in place by clamping bar 57 is a flexible tube 58 through which cable 20 is passed. Guide supports 54, 55 and 56 are similar in form to cable guides 18A, 18B and 49 of FIGS. 4–6, except that the recessed or concave bearing surfaces are replaced by simple cylindrical surfaces as shown. The modification of FIG. 7 has the same advantages claimed in the modification shown in FIGS. 4–6 and the further advantage that tube 58 holds cable 20 in place under operating conditions as well as when the cable is disconnected. Greater security in operation and greater convenience in connection of the device are thus realized in this modification. An additional feature for improved convenience and adaptability in the mounting of bracket 19 is slot 59 provided in the mounting surface 19A of bracket 19 for accepting mounting bolts utilized for mounting bracket 19 to the tongue of the trailer.

The guide assembly 60 of FIG. 8 employs a plurality of cyclindrical guides 61–65 providing bearing surfaces for a tension member such as, for example, flat belt 66. The multiplicity of guides 61–65 further increases the total bearing surface area and the resulting frictional forces provided over the assemblies shown in FIGS. 1–7 making this variation particularly suitable for heavy trailer loads or for towing other heavy vehicles.

FIG. 9 shows an end view of guide assembly 60 as observed in the direction of the arrows, 9, 9', of FIG. 8 with an optional top plate 67 added to prevent belt 66 from slipping off the guides 61–65. The effectiveness of plate 67 in serving this function is equal to the effectiveness of tube 58 in FIG. 7 and the advantages are the same. Again the guides 61–65 are rigidly bolted or welded to bracket 19 and plate 67 is welded to guides 61–65 or secured by the same mounting bolts 68–72 that hold the guide plate 67 in place.

FIGS. 11-14 illustrate a further modification of the structures shown in FIGS. 8 and 9 wherein the guide assembly 75 comprising bracket 19 employs a plurality of cylindrical guides 76-79 fixedly mounted thereon for providing bearing surfaces for a tension member such as, for example, flat strap or belt 80.

Guides 77 and 78 are movably positioned in slots 81 and 82, respectively, in the inclined surface of bracket 19 and each bolted therein at given points by bolts 83 and 84, respectively.

The movement of guides 77 and 78 toward the center of the bracket decreases the amount of the surfaces of guides 76-79 over which the strap or belt 80 must slide, and accordingly, decreases the resistance of belt movement during a trailer swaying action. The closer guides 77 and 78 are to guides 77 and 79, respectively, the greater the amount of the surfaces of guides 76-79 that are exposed to the belt and the greater the amount of frictional resistance to belt movement.

It should be recognized that the modified guide assemblies of FIGS. 4-14 operate in conjunction with cable 20 or belt 66 and 80, turnbuckle 23, toggle release 21, etc. as explained earlier in connection with the structure illustrated in FIGS. 1-3.

The performance of the sway control device in all its modified forms described above may be enhanced by numerous modifications. Cable 20 and the various forms of the guides, 18A, 18B, 49, 58 and 61-65 and 76-79, for example, may be coated with nylon or other synthetic material to reduce wear and improve performance. Springs may be used in series with cable 20 to optimize its tensile characteristics or to prevent its fracture under conditions of shock. Variations in the design of bracket 19 or in the mounting or securing of parts may be found to improve performance or reduce cost.

It has therefore been demonstrated that the improved sway control device described herein effectively overcomes the disadvantages of prior art devices and fulfills the stated objects of this invention. The improved sway control device utilizes a minimum number of moving parts, requires little or no maintenance or periodic adjustments and will not readily wear out. Because of the reduced initial tension required in the flexible cable or belt, the tendency for such cable or belt to fracture in use is materially reduced. Various features incorporated in the design of the device also simplify the mounting and adjustment procedures involved in preparing the device for operation. As readily noted, any of the structures shown and described may be used with cable or belt tensioning means and the belt or cable may be formed of any suitable material. Further, the sway control structures disclosed are closely arranged to the towing vehicle thereby providing the restraining force at the trailer hitch rather than at a point further along the drawbars where more force may be needed to control sway.

Although but a few embodiments of the present invention have been illustrated and described, it will be apparent to those skilled in the art that various additional changes and modifications may be made therein without departing from the spirit of the invention or from the scope of the appended claims.

What is claimed is:

1. A sway control device for mounting on the tongue of a vehicle towed trailer comprising in combination: guiding means mounted on the tongue having one or more arcuate guiding surfaces, at least one of said arcuate guiding surfaces being non-rotatably secured to the tongue, a flexible operating means comprising first and second end portions and an intermediate portion, said intermediate portion of said operating means engaging each of said non-rotatably secured arcuate guiding surfaces in a manner to induce frictional dampening thereon, said first and second end portions of said operating means being connectable to a towing vehicle at points spaced equally from the attachment of the towing vehicle to the trailer, and means for adjusting the tension of said operating means to keep said operating means taut against said non-rotatable arcuate guiding surface for inducing sliding resistance to the movement of said operating means about said non-rotatable arcuate guiding surfaces.

2. The sway control device set forth in claim 1 wherein:

said guiding means comprises a plurality of non-rotatable mounted spools mounted in a straight line laterally across the longitudinal axis of the tongue of said trailer.

3. The sway control device set forth in claim 1 wherein:

said guiding means is mounted on a bracket on the tongue and positioned at an acute angle with the tongue such that the forward portion of said guiding surfaces facing the towing vehicle are closer to the tongue than the rearward portion of said guiding surfaces.

4. The sway control device set forth in claim 1 wherein:

said guiding means comprises a plurality of spaced non-rotatable arcuate surfaces having one surface positioned on the longitudinal axis of the tongue and two surfaces spaced opposite from each other laterally one on each side of the longitudinal axis of the tongue of said vehicle.

5. The sway control device set forth in claim 4 wherein:

said two surfaces are arranged in a line substantially perpendicular to the longitudinal axis of the tongue closer to the towed trailer than said one surface.

6. The sway control device set forth in claim 5 wherein:

said guiding means is mounted on a bracket on the tongue and positioned at an acute angle with the tongue such that said one surface is closer to the tongue than said two surfaces.

7. The sway control device as set forth in claim 1 in further combination with:

mechanical toggle means connected to said operating means and utilized for obtaining greater leverage to induce tautness in said operating means engaging said guiding means and for expediting the connection and disconnection of said operating means to and from said towing vehicle.

8. The sway control device as set forth in claim 1 wherein:

said guiding means and their arcuate surfaces are adapted to be secured directly to a conventional trailer tongue provided with means for receiving and securing said guiding means.

9. The sway control device set forth in claim 1 wherein:
at least one of said guiding means is adjustably mounted in an arrangement to the remaining guiding means for increasing and decreasing the surfaces of said guiding means exposed to said operating means.

10. The sway control device set forth in claim 9 wherein:
said guiding means are mounted on a bracket on the tongue and positioned upwardly and rearwardly toward the towed trailer at an acute angle with the tongue.

11. The sway control device as set forth in claim 1 wherein:
said guiding means mounted on the tongue comprises a pair of rotors rotatably mounted on the tongue at positions spaced from each other laterally one on each side of the longitudinal axis of the tongue and at least one non-rotatably arcuate guiding surface secured to said tongue and positioned between said pair of rotors.

12. A sway control device for mounting on the tongue of a vehicle towed trailer comprising in combination:
a first guiding means comprising a rotor mounted on the longitudinal axis of the tongue adjacent its free end,
a second guiding means comprising a pair of non-rotatable arcuate guiding surfaces mounted on the tongue laterally one on each side of the longitudinal axis of the tongue,
said second pair of guiding surfaces being positioned adjacent said first guiding means between said first guiding means and the body of the towed trailer,
a flexible operating means comprising first and second end portions and an intermediate portion,
said intermediate portion of said operating means engaging said first guiding means and said pair of non-rotatable arcuate second guiding means in a serpentine manner,
said first and second end portions of said operating means being connectable to a towing vehicle at points spaced equally from the attachment of the vehicle to the towed trailer, and
means for adjusting the tension of said operating means taut against said first and second guiding means for inducing resistance to the movement of said operating means about the surface of said non-rotatable arcuate second guiding means.

13. The sway control device set forth in claim 12 wherein:
said second guiding means comprises a pair of non-rotatable arcuate guiding surfaces fixedly mounted on the tongue at positions spaced from each other laterally one on each side of the longitudinal axis of the tongue.

14. The sway control device set forth in claim 13 wherein:
said first guiding means and second guiding means are mounted on a bracket on the tongue and positioned at an acute angle with the tongue such that said first guiding means is closer to the tongue than said second guiding means.

15. The sway control device set forth in claim 13 wherein:
said guiding means comprises a single arcuate conduit fixedly mounted on the tongue substantially duplicating said pair of arcuate guiding surfaces.

16. The sway control device set forth in claim 12 wherein:
said first guiding means is mounted on the tongue, and
said second guiding means is mounted on a bracket on the tongue positioned at an acute angle with the tongue such that said second guiding means is a greater distance from the tongue than said first guiding means.

17. The sway control device set forth in claim 12 in further combination with:
an arcuate conduit duplicating at least in part the curvature of said first and second guiding means in a serpentine manner for receiving therethrough said operating means.

18. The sway control device set forth in claim 17 in further combination with:
a bracket mounted on the tongue for supporting said arcuate conduit,
said bracket being arranged at an acute angle with the longitudinal axis of the tongue for elevating the portion of the conduit adjacent the trailer above the portion of the conduit adjacent the vehicle.

19. A sway control device for mounting on the tongue of a vehicle towed trailer comprising in combination:
at least one rotor rotatably mounted on the tongue of a trailer,
at least one guiding means comprising non-rotatable arcuate guiding surfaces fixedly mounted on the tongue and spaced from each other and said rotor,
a flexible operating means comprising first and second end portions and an intermediate portion,
said intermediate portion of said operating means engaging each of the peripheries of said rotor and said non-rotatable arcuate guiding surfaces in a serpentine manner,
said first and second end portions of said operating means being connectable to a towing vehicle at points spaced equally from the attachment of the vehicle to the trailer, and
means for adjusting the tension of said operating means taut against the periphery of said rotor and said non-rotatable arcuate guiding surfaces for inducing frictional sliding resistance to the movement of said operating means.

20. A sway control device for mounting on the tongue of a vehicle towed trailer comprising in combination:
guiding means mounted on the tongue and having an arcuate guiding surface fixedly attached to the tongue in a non-rotative manner,
a flexible tensioning means comprising first and second end portions and an intermediate portion,
said intermediate portion of said tensioning means engaging said arcuate guiding surface,
said first and second end portions of said tensioning means being connectable to a towing vehicle at points spaced equally from the attachment of the vehicle to the trailer tongue, and
means for adjusting the tension of said tensioning means to keep said tensioning means taut against said arcuate guiding surface for inducing sliding resistance to the movement of said tensioning means around at least a part of said arcuate guiding surface.

21. The sway control device set forth in claim 20 wherein:
said arcuate guiding surface comprises a continuous surface extending laterally across the longitudinal axis of the tongue in an arcuate manner.

22. The sway control device as set forth in claim 20 in further combination with:
toggle means connected to said tensioning means for expediting the connection and disconnection of said tensioning means to and from said vehicle towed trailer.

23. The sway control device as set forth in claim 20 wherein:
said arcuate surface is adapted to be secured directly to a conventional trailer tongue provided with means for receiving and securing said arcuate surface.

24. A sway control device for mounting on a first vehicle comprising in combination:
guiding means for mounting on the first vehicle having one or more arcuate guiding surfaces,
at least one of said arcuate guiding surfaces being non-rotatably secured to the first vehicle,
a flexible operating means comprising first and second end portions and an intermediate portion,
said intermediate portion of said operating means engaging each of said non-rotatably secured arcuate guiding surfaces in a manner to induce frictional dampening thereon,
said first and second end portions of said operating means being connectable to a second vehicle at points spaced equally from the attachment of the second vehicle to the first vehicle, and
means for adjusting the tension of said operating means to keep said operating means taut against said non-rotatable arcuate guiding surface for inducing sliding resistance to the movement of said operating means about said non-rotatable arcuate guiding surfaces.

25. A sway control device demountably connectable between a towing vehicle and a vehicle being towed comprising in combination:
a flexible operating means comprising first and second ends and an intermediate portion,
at least one non-rotatable fixedly mountable arcuate guiding surface frictionally engaging said intermediate portion of said operating means,
said ends of said operating means being secured to one of said vehicles and said intermediate portion of said operating means being positioned over said arcuate guiding surface in a taut manner to induce frictional dampening between said operating means and said arcuate surface, and
dual purpose means for tightening the perimeter of said operating means to operationally engage said arcuate guiding surfaces and to loosen said operating means for disconnection between said vehicles.

26. A sway control device interconnectable between a towing vehicle and a vehicle being towed comprising in combination:
flexible tensioning means comprising a perimeter having opposite ends and an intermediate portion,
at least one non-rotatable fixedly mountable arcuate guiding surface adapted to be opertionally engaged by said intermediate portion of said operating means,
said opposite ends of said operating means adapted to be spacedly secured to one of said vehicles and said arcuate guiding surfaces adapted to be secured to said other vehicle for engagment by said operating means,
means for causing taut engagment of said perimeter of said operating means against the perimeter of said arcuate guiding surface in a manner to induce frictional dampening thereon, and
means for releasing said taut engagement of said operating means to allow for disengagement of said operating means from one of said towing vehicles and said vehicle being towed.

* * * * *